Figure 1:
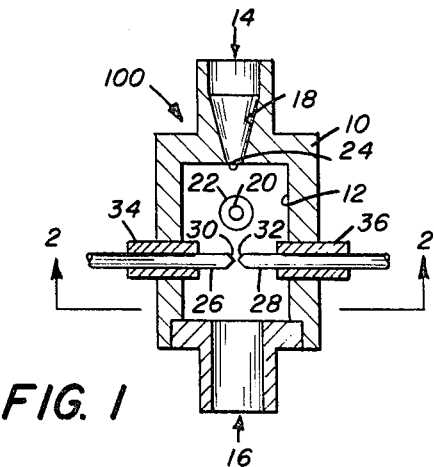

United States Patent

[11] 3,616,412

| [72] | Inventor | Oliver W. Gnage<br>Rochester, N.Y. |
|---|---|---|
| [21] | Appl. No. | 762,386 |
| [22] | Filed | Sept. 25, 1968 |
| [45] | Patented | Oct. 26, 1971 |
| [73] | Assignee | Eastman Kodak Company<br>Rochester, N.Y. |

[54] METAL RECOVERY UNIT
6 Claims, 3 Drawing Figs.

[52] U.S. Cl. .................................................. 204/195,
204/228, 204/231, 204/275, 324/94
[51] Int. Cl. ............................................... B01k 3/00,
B01k 3/02
[50] Field of Search .......................................... 204/228,
275, 195, 231, 109

[56] References Cited
UNITED STATES PATENTS

| 2,490,730 | 12/1949 | Dubilier | 204/231 X |
|---|---|---|---|
| 2,886,771 | 5/1959 | Vincent | 204/195 X |
| 3,242,729 | 3/1966 | Keller | 204/195 X |
| 3,418,225 | 12/1968 | Wick et al. | 204/109 |
| 3,450,622 | 6/1969 | Cothran | 204/275 X |
| 3,463,711 | 8/1969 | Geyken | 204/109 |

*Primary Examiner*—John H. Mack
*Assistant Examiner*—D. R. Valentine
*Attorneys*—Walter O. Hodson, Paul R. Holmes and Robert F. Cody ABSTRACT: A coulometric device which may be used to determine the concentration of silver in solutions used in photography is disclosed. The device may be made an in-line part of a system for the recovery of such silver. The device is of simple rugged construction and utilizes for silver-determining purposes three electrically conductive probes which are housed within a chamber, such chamber having inlet and outlet orifices. One probe is situated near the inlet orifice; the other two probes are near each other, and near the outlet orifice. The first probe, and the second and third probes, are periodically reverse excited. Silver periodically builds up on the second and third probes, causing the resistance therebetween to lower periodically. The duration necessary to lower such resistance to a certain threshold level is proportional to silver concentration.

PATENTED OCT 26 1971 3,616,412

OLIVER W. GNAGE
INVENTOR.

BY

ATTORNEYS

METAL RECOVERY UNIT

BACKGROUND OF THE INVENTION

1. Field of the Invention

This invention relates in general to coulometric devices, and, as presently preferred, the invention provides an in-line device for use in conducting therethrough used photographic fixing solution while, simultaneously, functioning to provide a measure of the silver contained within the used fixing solution. By means of the invention, the concentration (whether variable or not) of a salt within a solution may be measured as such solution is carried through a conduit, there being no need with the invention to interrupt flow of, or to sample, such solution for concentration-measuring purposes. And when employed in its presently preferred way, the invention forms part of, and is in line with, a system—or a branch thereof—for the recovery of silver from used fixing solution, variations in the rate of flow of fixing solution through such system being inherently compensated for by means of the invention as the invention serves to produce a signal to control effectively the recovery of silver from such solution.

2. Description of the Prior Art

The need for determining concentration of silver within used photographic fixing solution, whereby the electric current used in a system for the recovery of such silver may be set as a function of such concentration, is well known. There have been various attempts in the past to measure the silver concentration of used fixing solution, e.g. by effectively measuring the rate at which a silver plate forms on a wire that is immersed within a fixing solution bath. For a variety of reasons, such prior art arrangements have not been utilized in silver recovery systems: they either could not effectively respond to changes in silver concentration; or they could not easily and/or inexpensively be included to form part of a silver recovery system.

SUMMARY OF THE INVENTION

Apparatus embodying the invention utilizes to advantage the movement—into a silver recovery cell—of used fixing solution to permit an easy in-line coulometric determination of the silver concentration of such fixing solution. In so utilizing the movement of fixing solution, the invention defines preferred respective locations for electrodes within a silver sensing-and-measuring unit, whereby desired electrodeposition of silver within the measuring unit is facilitated. The electrodes employed in the unit may be reverse excited periodically so that the solution of such electrodes at the beginning of subsequent silver concentration measuring cycles will always be substantially the same. Thus, in the event that the silver concentration of the fixing solution were to vary, such variations would be reflected in the output signal produced by means of the invention.

In its presently preferred form, the invention provides a fitting having a chamber therein. The fitting has inlet and outlet orifices for conducting fixing solution through the fitting. Near the inlet side of the fitting, an anode is placed; near the outlet side of the fitting, a pair of aligned, closely spaced, cathodes are placed. As used fixing solution flows through the fitting, the electrolyzing potentials applied to the electrodes cause the gap between the cathodes to be closed gradually by silver deposits, the rate of deposition of such silver being in proportion to the concentration of silver within the fixing solution. Electrodeposition of silver is facilitated by virtue of the cathodes being downstream of their anode, rather than vice versa: that is, cations of silver are carried, by the movement of the fixing solution, in the direction of their cathode(s). A circuit is provided to sense when the resistance between the cathodes falls below a certain level, thereby to produce a signal representing silver concentration, which signal may be employed to control the recovery of silver within a recovery system. Such sensing is effective because, though the cathodes are immersed in an electrolyte, i.e. in electrically conductive fixing solution, the resistance path between such cathodes is in direct relation to the length of such path. As above stated, the electrodes are periodically reverse excited: i.e. the anode is periodically negatively excited; and the cathodes are periodically positively excited. Such reverse excitation serves to strip silver from the bridged cathodes, the stripped silver being carried out of the fitting and into the recovery cell by the normal flow of fixing solution.

An object of the invention is to provide improved apparatus for use in measuring the concentration of a salt within a solution.

Another object of the invention is to provide apparatus for use in conducting therethrough a salt-containing solution while, simultaneously, producing a measure of the salt concentration of such solution.

Another object of the invention is to provide a simple, inexpensive unit for use in determining the concentration of silver in a solution used in photography.

Another object of the invention is to provide an improved coulometric device for automatically producing an indication of the concentration of silver in a fixing solution as such solution is conveyed to a silver recovery cell in a silver recovery system.

The invention will be described with reference to the figures, wherein

Figure 2:
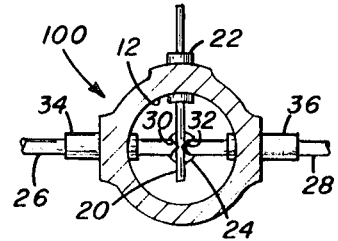
Figure 3:
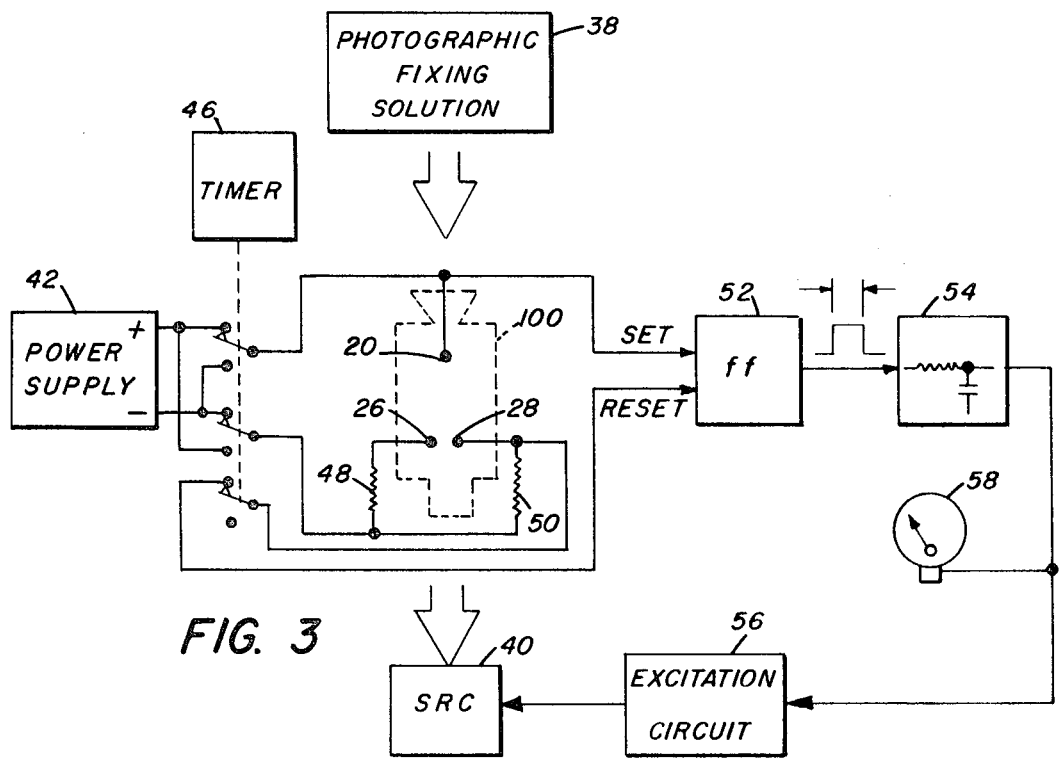

FIG. 1 is a cross-sectional view of a device embodying the invention, which view is taken along a line that is perpendicular to the longitudinal axis of such device, FIG. 2 is a cross-sectional view of the device of FIG. 1 taken along line 2—2 of FIG. 1, and FIG. 3 is a schematic diagram of a circuit showing a presently preferred adaptation of the invention.

With reference to FIGS. 1 and 2, apparatus 100 according to the invention has an electrically nonconductive casing 10, e.g. plastic, which is provided with a chamber 12. An inlet orifice 14 and an outlet orifice 16 serve to carry a solution to and fro respectively, the chamber 12. As indicated, the inlet orifice 14 is tapered at 18 to funnel solution directly at an electrode 20; and it is understood that, while such is not shown, the apparatus of FIGS. 1 and 2, may be provided with inlet and outlet connectors.

The electrode 20 is supported in an insulator 22, and such electrode is situated within the chamber 12 near the mouth 24 of the inlet orifice 14. Near the outlet orifice 16, and disposed to be wetted by solution as such solution flows through the chamber 12 from the inlet orifice 14 to the outlet orifice 16, are a pair of electrodes 26, 28. As shown, the electrodes 26, 28 have, respectively, tapered tips 30, 32; and such electrodes 26, 28 are supported, respectively, in insulators 34, 36.

The electrodes 26, 28, which are preferably platinum, are so spacially aligned that their tips 30, 32 are a small predetermined space apart, the electrodes 26, 28 being similarly electrically excited while/when the electrode 20 is oppositely electrically excited.

It is above stated that the presently preferred use of the unit of FIGS. 1, 2 is to sense and measure the silver concentration of used photographic fixing solution; and that apparatus according to the invention produces a meaningful measurement of silver concentration regardless of how such concentration may vary; and that electrical signals produced by means of the invention to control effectively the recovery of silver from a fixing solution are inherently adjusted to compensate for variations in the flow rate of solution through the unit of the invention. These aspects of the invention may be appreciated from FIG. 3 which shows schematically the conveyance of used photographic fixing solution from a source 38 thereof, through a unit 100 as in FIGS. 1 and 2, to a conventional silver recovery cell 40. The electrode 20, although periodically oppositely excited, will be considered an anode for purposes of description; and the electrodes 26, 28 will be considered cathodes. Power is supplied to the electrodes 20, and 26, 28 from a supply 42, the output of which is applied through switches 44 to the electrodes 20 and 26, 28. The switches 44 are periodically operated to reverse the potentials applied to the electrodes—and to disable effectively the circuit of FIG. 3 during the time that the silver is stripped from the electrodes 26, 28 as noted above—by means of a timing device 46. The timing device 46 may be a motor-cam combination which cooperates with the switches 44.

In this form of the invention, the similarly excited electrodes 26, 28 are excited via a pair of respective, preferably equisized, resistors 48, 50. And a flip-flop circuit 52 is biased to its SET state so long as the signal applied to the anode 20 is positive and, simultaneously, so long as the negative potential of the supply 42, which is applied to the flip-flop circuit 52, is less that a certain amount. As the fixing solution flows through the unit 100, the deposition of silver on the cathodes 26, 28 gradually builds up and, ultimately, causes the resistance across the cathodes 26, 28 to drop below a certain threshold level. At the instant such resistance level is reached, the negative voltage applied to the RESET side of the flip-flop circuit 52 is at a sufficiently high level to cause the flip-flop circuit 52 to be reset. Thus, the flip-flop circuit 52 produces a square wave output signal, the duration of which (provided the output point of the flip-flop circuit is suitably chosen) is directly proportional to the time that it takes to change sufficiently the resistance between the electrodes 26, 28; and which duration is a proportional to the concentration of silver within the fixing solution. By conventional integrating means 54 the square wave output from the flip-flop circuit 52 is converted to a representative signal level for controlling the output of an excitation circuit 56 that regulates the current used in the silver recovery cell 40. A meter 58 may be provided to indicate the magnitude of the silver concentration of the fixing solution.

The timer 46 is designed to hold the switches 44 in their position, as shown, for a duration which is at least as long as the maximum possible duration of a flip-flop circuit output signal. This is to ensure that heavy concentration silver-measuring cycles will not be interrupted by untimely actuation of the switches 44. And when such timer places the switches 44 in their respective lower positions, the silver which forms on the cathodes 26, 28 is given sufficient time to get stripped from such cathodes, the flip-flop circuit 52 being effectively disabled from operating during this time. It is this timed conveyance of fixing solution away from the "positively" excited cathodes 26, 28 which aids the silver-stripping function; and it is the timed conveyance if fixing solution toward negatively excited cathodes 26, 28 which aids the desired deposition of silver on such cathodes.

By causing the flip-flop circuit 52 to produce cyclically a discrete signal the duration of which represents silver concentration, the output of the recovery cell excitation circuit 56 is continually made to follow up and adjust for variations in the silver concentration of the solution passing through the silver recovery system. Since the rate of flow of solution through the silver recovery system influences the quantity of silver to be recovered by means of the silver recovery cell 40, such flow naturally also effects the rate at which the cathode deposits are formed. Therefore, when the flow rate of solution into the silver recovery cell 40 is low, i.e. when the excitation from the circuit 56 is required to be low also, the duration of the output signal from the flip-flop circuit 52 is short, this being because it takes a comparatively long time for the above-noted threshold resistance to occur; and attendantly such low flow rate of solution into the silver recovery cell 40 is inherently compensated for by means of the invention.

That the silver-sensing unit 100 of the invention is a simple ruggedly constructed device which can be readily made an in-line part of a silver recovery system is apparent from an inspection of FIGS. 1 and 2, such figures showing the unit in question in its approximate actual size.

The invention has been described in detail with particular reference to a preferred embodiment thereof, but it will be understood that variations and modifications can be effected within the spirit and scope of the invention as described hereinabove and as defined in the appended claims. Typical of such modifications which are within the purview of the invention would be, say, a change to the circuit of FIG. 3 that permits only one of the two indicated cathodes to be electrified, the other of such cathodes serving merely as a passive terminal which cooperates with the first cathode as a function of the silver deposit on such first cathode.

I claim:

1. A device, useful for determining the concentration of a salt in a solution, comprising
   a. means having a chamber therein, said means having an inlet orifice into and an outlet orifice from said chamber for use in conveying said solution into and out of said means,
   b. first electrically conductive means, disposed in said chamber, proximate said inlet orifice,
   c. second and third electrically conductive means, disposed in said chamber, proximate, but spaced apart from each other to form an electrical resistance path therebetween, said second and third electrically conductive means being further disposed proximate said outlet orifice,
   said first conductive means being adapted to be electrically insulated from said second and third conductive means, and said first electrically conductive means being adapted to be electrically excited positively when at least one of said other electrically conductive means is electrically excited negatively, and
   d. circuit means responsive to changes in the electrical resistance which obtains between said second and third electrically conductive means for detecting when said resistance falls below a certain predetermined level, said electrical resistance between said second and third electrically conductive means being inversely proportional to the amount of deposits which form on said second and third conductive means.

2. The device of claim 1 wherein said second and third electrically conductive means are spacially aligned with respect to each other.

3. The device of claim 2 wherein the part of at least one of said second and third electrically conductive means which is proximate the other of said means is tapered.

4. Apparatus responsive as a function of the concentration of silver in a solution, which apparatus is useful in combination with a system for the recovery of such silver, and which system includes, at least in part, means for conveying such solution from a source thereof to a silver recovery cell, comprising
   a. means disposed to receive at its input end said solution, and to convey said solution to said recovery cell from its output end,
   b. a first electrode disposed near the input end of said means,
   c. a second electrode electrically insulated from said first electrode and disposed near said output end of said means,
   d. an electrically conductive member which is electrically insulated from both said electrodes, said member being disposed proximate, but spaced apart from, said second electrode to form a gap between said electrode and said member, said gap having a predetermined nominal reference size whereby when said first and second electrodes are respectively positively and negatively excited electrically, the gap between said second electrode and said member is diminished, with respect to its said nominal reference size by the deposition of silver on said second electrode, said deposition being at a rate that is proportional to the concentration of said silver within said fixing solution,
   e. means for simultaneously electrically exciting periodically said first electrode positively and said second electrode negatively for a predetermined duration, and for periodically reversing the polarities of said excitations, and
   f. means responsive, while said first and second electrodes are respectively positively and negatively excited, to changes in the electrical resistance which obtains between said second electrode and said conductive member for detecting the time that it takes for the deposition of silver on said second electrode to cause the resistance between said second electrode and said member to fall below a certain predetermined level, said time being proportional to the concentration of silver in said solution.

5. The apparatus of claim 4 wherein said member is an electrode which is also negatively excited when said first electrode is positively excited.

6. The apparatus of claim 5 wherein said second electrode and said member are both elongated and spacially disposed substantially end to end with respect to each other.

* * * * *